(No Model.) 3 Sheets—Sheet 1.

E. H. GRAFUNDER.
GRAIN DRILL.

No. 492,009. Patented Feb. 21, 1893.

Witnesses.
C. N. Keeney,
Anna O. Faust.

Inventor.
Ernst H. Grafunder,
By
Benedict and Morsell
Attorneys.

THE NORRIS PETERS CO., PHOTO-LITHO., WASHINGTON, D. C.

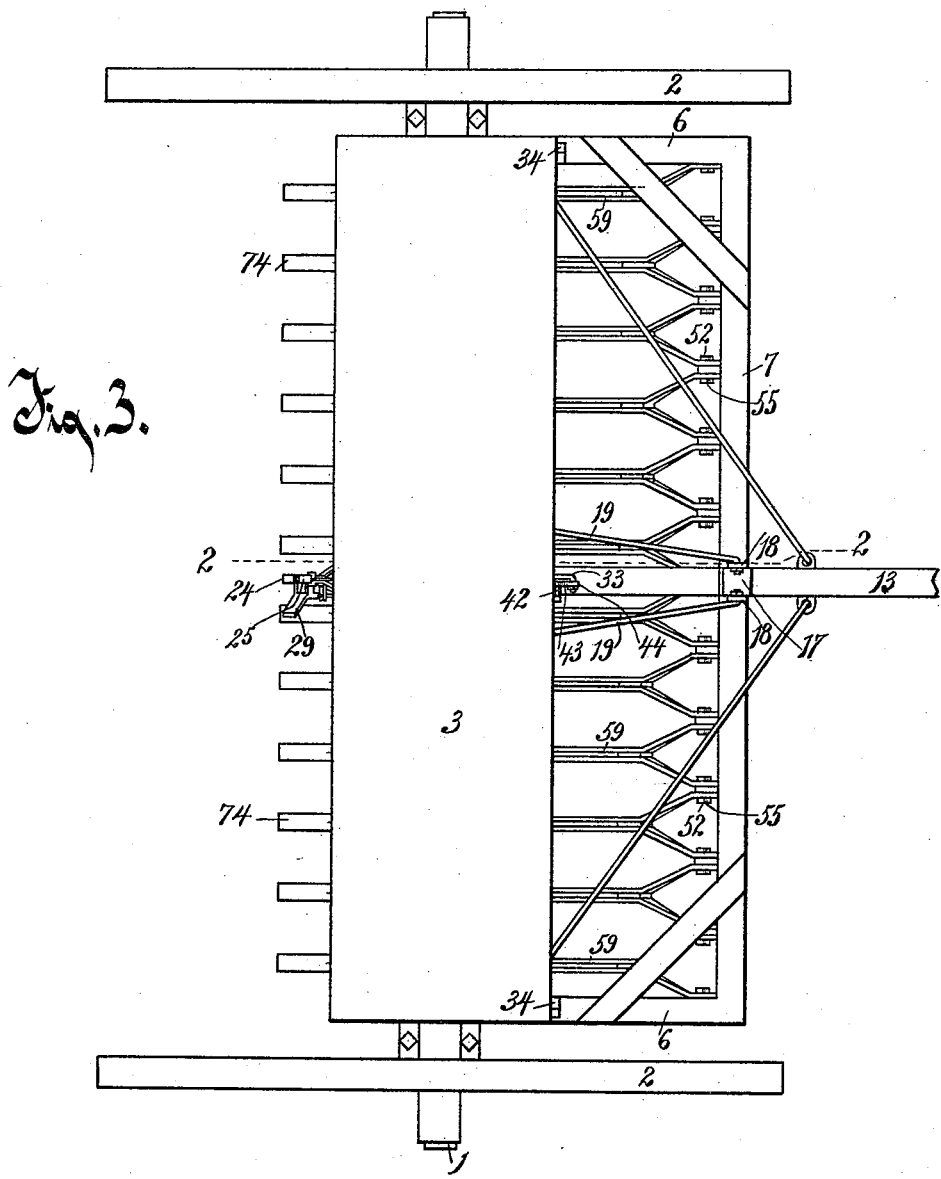

(No Model.) 3 Sheets—Sheet 3.
E. H. GRAFUNDER.
GRAIN DRILL.
No. 492,009. Patented Feb. 21, 1893.
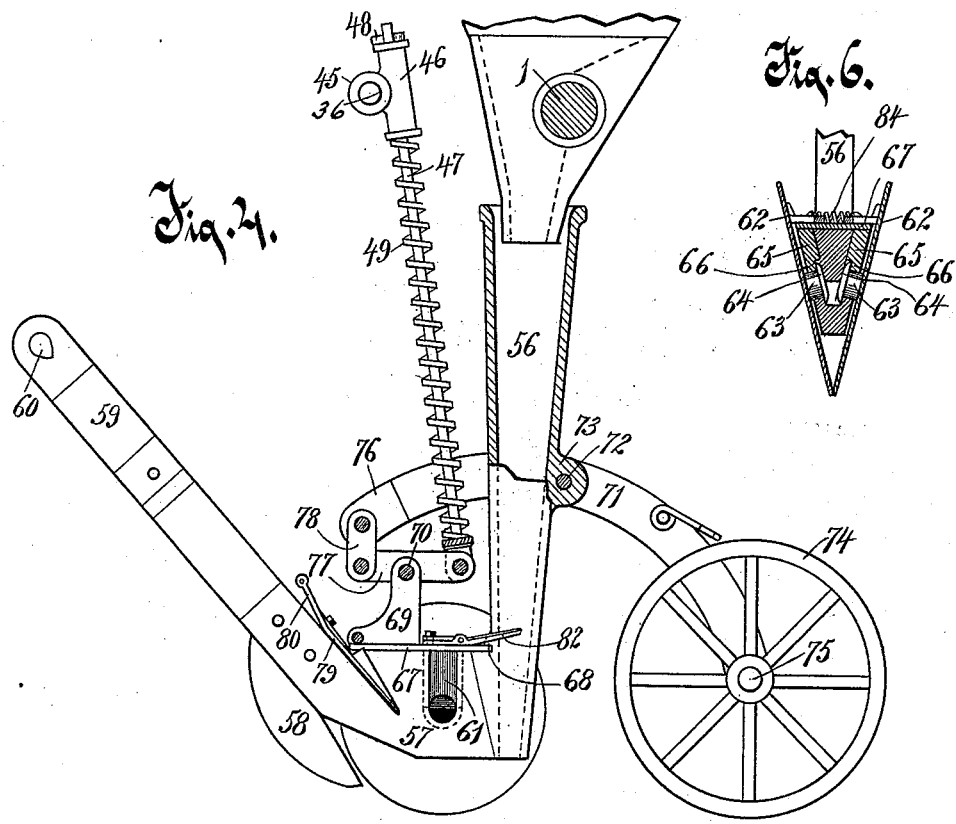
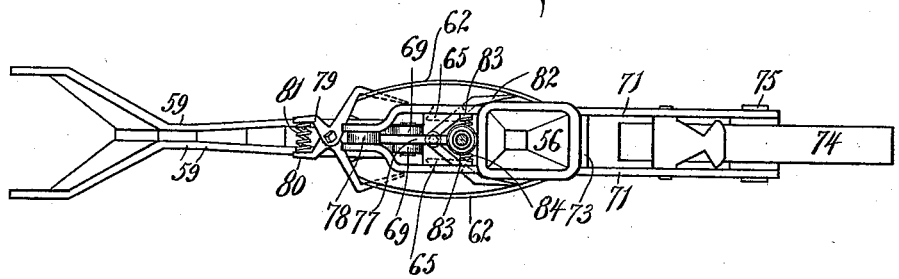
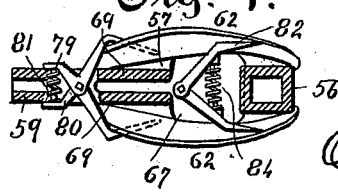
Witnesses.
Inventor.
Ernst H. Grafunder
By Benedict and Morsell
Attorneys

UNITED STATES PATENT OFFICE.

ERNST H. GRAFUNDER, OF HORICON, WISCONSIN.

GRAIN-DRILL.

SPECIFICATION forming part of Letters Patent No. 492,009, dated February 21, 1893.

Application filed March 3, 1892. Renewed January 19, 1893. Serial No. 459,005. (No model.)

*To all whom it may concern:*

Be it known that I, ERNST H. GRAFUNDER, of Horicon, in the county of Dodge and State of Wisconsin, have invented a new and useful Improvement in Grain-Drills, of which the following is a description, reference being had to the accompanying drawings, which are a part of this specification.

My invention has relation to improvements in grain drills and has particular reference to the means for elevating the cutting disks and covering wheel.

In illustrating my invention, I have shown the same in connection with certain parts which have been fully shown and described in another application filed by me simultaneously herewith. I therefore, do not lay claim herein to anything shown and described in the application referred to.

Figure 1:
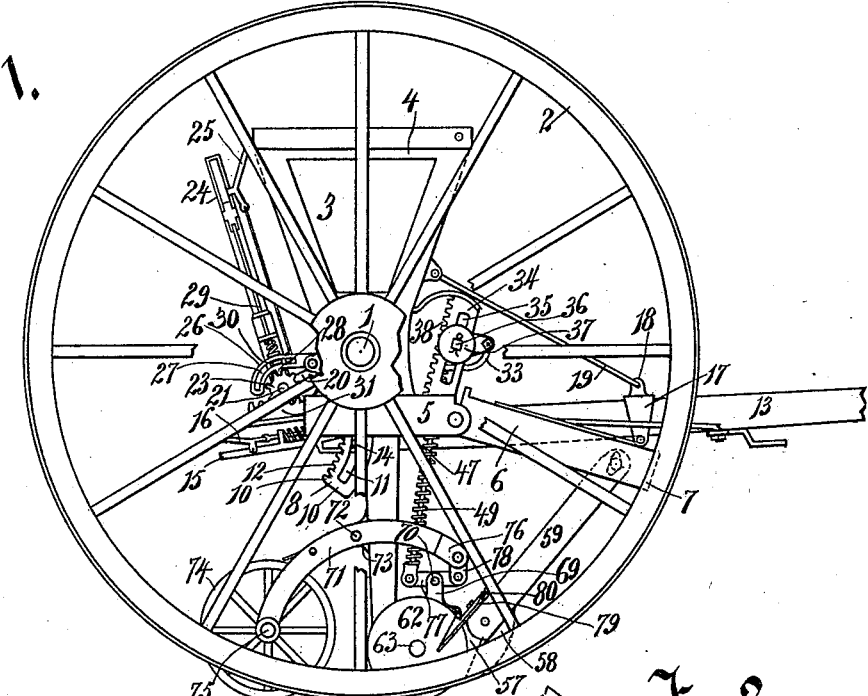
Figure 2:
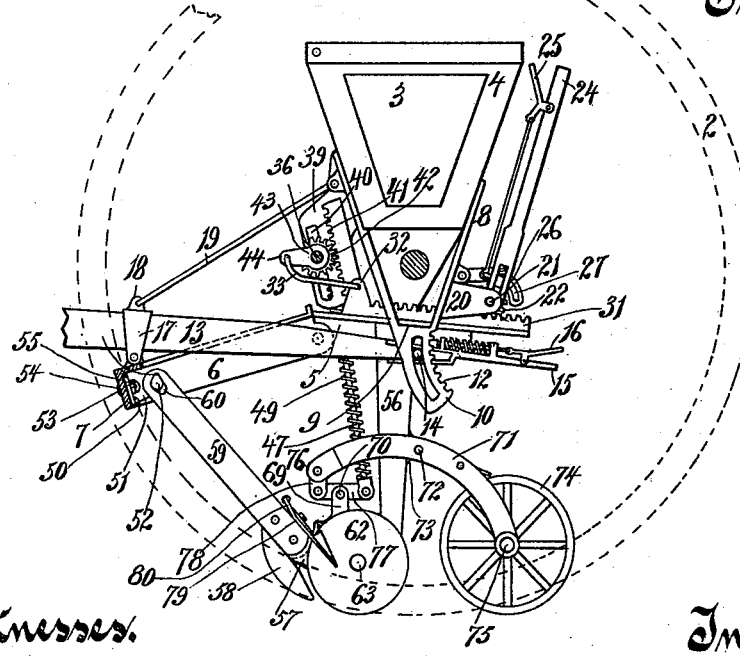

In the accompanying drawings, Figure 1, is a side view of a machine embodying my invention. Fig. 2, is a transverse section on the line 2—2 of Fig. 3. Fig. 3, is a plan view. Fig. 4, is an enlarged side elevation of a part of the machine, one of the cutting disks being removed to show the bearing slots for the trunnions of the disk, and a part of the seed tube broken away. Fig. 5, is a plan view of Fig. 4, the view being a horizontal section through the latter figure on a plane slightly above the seed tube; and Fig. 6 is a transverse section of the cutting disks, and, Fig. 7 is a sectional plan view of the double scraper on the dotted line *a, a*, Fig. 4.

Like numerals of reference indicate like parts throughout the several views.

Referring to the drawings, the numeral 1 indicates the axle of the machine upon which is mounted the wheels 2, 2.

The numeral 3 indicates a seed box or hopper, having secured to the ends thereof brackets 4, 4, one of said brackets being clearly illustrated in Fig. 1 of the drawings. Each of these brackets extends below the hopper and has secured thereto fixed side pieces 5, of the frame of the machine. To the forward ends of these side pieces is pivotally secured the movable portion of the frame, consisting of the side pieces 6, 6 and the front connecting piece 7.

The numeral 8 indicates a central yoke secured to the hopper, and extending below the same.

Depending from the bottom 9, of the yoke are two rearwardly curved arms 10, 10 having elongated curved slots 11, 11, therein, and having their rear edges toothed as at 12, 12. The pole 13 of the machine has its rear end passing between these arms, and is provided at this end with a transverse shaft 14 said shaft entering the elongated slots of the rearwardly curved arms 10. The pole is furthermore provided at its rear extremity with a handle 15, upon which is mounted a spring pawl, 16, adapted to engage the teeth 12, of arms 10.

Pivoted to the front connecting piece 7 of the movable frame is a clip 17 through which the forward end of the pole 13 passes. This clip is provided with upwardly extending apertured ears 18 to which the lower end of supporting arms 19, 19, are secured, the upper end of said arms being attached to the hopper.

It will be seen that by the connection between the pole or thill of the machine and the front connecting piece of the movable frame that as the rear end of said pole is raised or lowered by the manipulation of the handle 15, secured thereto, the front end of said pole, through the medium of the clip 17, causes the raising and lowering of the movable frame.

Extending rearwardly from the yoke are lugs 20, 20, in which is journaled a transverse shaft 21, said shaft having rigidly mounted thereon, between the lugs a gear wheel 22, and upon one end outside of the lug adjacent, a second gear wheel 23, also fast upon the shaft.

The numeral 24 indicates a lever, having its lower end loose upon the shaft. A spring pawl 25 is located upon the top of the lever, and extends down to engage the gear wheel 22.

Pivoted to the rear of the yoke 8, and in line with the end of the gear wheel 23, is a curved arm or pawl 26, having a curved slot 27, concentric with the shaft, said arm or pawl also provided with a depending lug 28, adapted to engage the teeth of the gear wheel 23. Upon that side of lever 24 corresponding to gear wheel 23 is a spring-actuated arm 29, having a suitable finger-piece at the top, and provided at its lower end with a lug 30, extending into the slot of curved arm or pawl 26. The gear wheel 22 is adapted to mesh with a rack bar 31, which rests and slides upon the bottom, 9, of the yoke. The forward end of this rack bar is provided with an upwardly-extending lug 32, to which one end of a link 33 is attached. The brackets 4, 4, are formed or provided with forwardly extending plates 34 (one of said plates being clearly shown in Fig. 1 of the drawings) which are provided with vertical slots 35, to receive the opposite ends of a front transverse shaft 36, the extremities of said shaft having fixed thereon gear wheels 37, which mesh with racks 38 formed upon the outer sides of the plates 34.

A bracket 39 is secured to the front side of the hopper at about the center thereof, and is provided with a vertical slot 40, and also upon one side with a rack 41. The shaft, 36, passes through the slot of this bracket, and also carries medially a toothed wheel or pinion 42, which meshes with the rack 41. This toothed wheel forms a part of the collar 43 which is fixed upon the shaft and said collar is provided with a crank 44, extending therefrom, and to which the forward end of link 33 is attached.

It will of course be understood that so long as the lug 28 of the curved arm or pawl 26 is in engagement with the teeth of gear wheel, 23, it will be impossible to move lever 24 owing to the fact that shaft 21, is locked against rotation by the engagement of said lug with the rigid ratchet wheel 23. If, therefore, it is desired to shift the position of the lever so as to move rack bar 31, all that is necessary is simply to press upon the finger-piece of spring-actuated arm 29, and thus raise said arm and at the same time the curved pawl, 26, out of engagement with the gear wheel 23. By now moving the lever downwardly, the rack bar is forced forwardly, and by moving the same upwardly the rack bar is forced rearwardly. When the proper position of the bar is thus attained, pressure upon the finger piece of the spring-actuated arm is removed, and the pawl allowed to assume its normal position.

If it is desired to shift the position of lever 24 without affecting the rack bar, all that is necessary to be done is simply to press upon the finger-piece of spring pawl 25, so as to raise said pawl out of engagement with gear wheel 22. Now, it is obvious that as rack bar 31 is moved forward or rearward in the manner just described, the front transverse shaft 36 is raised or lowered, as the case may be, in the several vertical slots which form bearings therefor, said raising and lowering being accomplished by the connection of link 33 with lug 32 of the rack and with crank 44 formed upon collar 43 rigidly mounted upon the shaft. This vertical movement of the shaft is facilitated by the pinions thereon meshing with the several racks.

Located upon shaft 36 are a series of collars 45, provided at their rear with tubular extensions 46. This construction is clearly illustrated in Fig. 4 of the drawings. Through these tubes pass the upper ends of a series of rods 47 provided above the tubes with transverse pins 48, and said rods encircled by coiled springs 49.

Secured to the rear of the angular front connecting piece, 7, of the frame are a series of brackets, each consisting of a transverse piece, 50, bearing against the connecting bar, and with a centrally projecting stem, 51, which is provided with laterally extending trunnions, 52, having projections at right angles thereto. Said stem also has an aperture 53 therein, at the point where it joins the transverse piece 50. Screws 54 pass through the front connecting bar and through the transverse piece of the brackets, the inner ends of said screws receiving nuts, 55, which are located in the space afforded by the apertures 53.

The numeral 56 indicates a seed tube formed or provided at its end with a forward extension or toe, 57, to the end of which is secured a colter, 58, and also the rear ends of a drag-bar consisting, preferably, of side pieces, 59, diverged at their forward ends and provided with elongated slots, 60, through which the trunnions 52 are adapted to pass, thereby forming a pivotal connection at the forward end of the frame. It will be noticed that toe 57 is of approximately V-form in cross section, or its sides tapered or converged downwardly and is provided upon opposite sides with recessed ways, 61, 61. The edges of the metal bordering these ways are beveled slightly, as shown in the drawings by dotted lines in Fig. 4.

Cutting disks 62, 62, are arranged upon opposite sides of the toe, and provided with short inwardly extending trunnions, 63, 63, at right angles thereto, said trunnions having enlarged annular ends, 64, 64. These ends fit the beveled ways, and are finally seated at the bottom thereof, and when in position, as clearly shown in Fig. 6 form a V or downward taper conforming to the taper of toe 57. In this manner the disks are converged at the point where the furrow is made and at the same time by providing each with a short inwardly extending trunnion, their free rotary motion is secured. Small blocks, 65, 65, having beveled edges registering with the bevels of the ways, and provided at their lower ends with semicircular recesses fitting over the trunnions, complete the bearings of the latter. The semicircular portions of the blocks referred to fit the trunnions between the annular heads thereof and the inner faces of the disks, while shoulders, 66, 66, bear against the periphery of the heads 64.

The upper ends of the ways are open, and covered by means of a removable plate, 67, having one end fitting beneath a lug 68, of the seed tube, and the opposite reduced end passing between two upwardly extending eyed lugs, 69, 69, forming bearings for a transverse bolt 70. When, therefore, it becomes necessary to detach the disks, all that is required is simply to take out bolt 70, after which the plate may be readily taken from its position, and the disks thus readily removed.

A frame consisting of curved side pieces 71, 71, turns upon a medial bolt 72, passing through an apertured lug, 73, at the rear of the seed tube. These side pieces at their lower ends, have a covering wheel, 74, arranged therebetween and turning upon a transverse shaft 75. A rocking lever 77, turns upon bolt 70, the forward end of said lever having pivotally connected thereto a link, 78, which also articulates with the forward ends 76 of the covering wheel frame. The rear end of the rocking lever is pivotally connected to the lower extremity of rod 47.

The numeral 79 indicates a scraper, consisting of two arms provided with inwardly extending bends pivoted together by a medial vertical pin. At one end, each of these arms are provided with short inwardly-extending lugs or pins, 80, which form means for supporting a coiled spring 81. The opposite ends of the arms are held firmly against the outer sides of the disks by the action of the spring, and in this way the forward ends are prevented from moving outwardly and thus releasing said spring from its supporting lugs. This scraper, as clearly shown in Fig. 4, is pivoted to the drag-bar 59, in such manner as to scrape the forward outer parts of the disk. A second scraper 82, is arranged to the rear of the first named, said scraper also consisting of two arms having their forward ends pivoted together by a pivot pin passing into plate 67, as shown more fully in Fig. 4. To the rear of the pivot pin each arm is provided with a short inwardly extending lug, 83, which extends into opposite ends of a coiled spring, 84, and thereby maintain said spring in place. The spring, of course, has the effect of forcing the rear ends of the scraping arms outwardly against the inner sides of the disks at the rear.

It will be seen from the foregoing specification that by exerting an upward pull upon the spring encircled rod, which is actuated through the transverse shaft 36, the pivoted drag-bars 59 are raised, and with them the cutting disks and covering wheel. When the front transverse shaft is lowered, the tubular extension, 46, compresses coiled spring 49, and said coiled spring bearing down upon the rear end of the rocking lever causes a down pressure upon the disk; and as the forward end of the rocking lever is connected to the corresponding end of the covering wheel frame by the link, an upward pressure is exerted upon the forward end of the covering wheel frame and consequently the rear end thereof forced downwardly. In this way, an equal downward pressure is obtained upon both the cutting disks and the covering wheel.

Having thus described my invention, what I claim, and desire to secure by Letters Patent, is—

1. In a grain-drill, the combination, of a pivoted covering wheel frame, a rocking lever, a link pivotally connecting one end of said lever with the forward end of the frame, and a vertically moving spring-cushioned rod having its lower extremity pivoted to the opposite end of the rocking lever, substantially as set forth.

2. In a grain drill, the combination of a rotatable and vertically adjustable shaft, a pivoted covering wheel frame, cutting disks, eyed lugs extending upwardly from the bearing frame of said cutting disks, a rocking lever turning upon a transverse pin having bearings in the eyes of the lugs, a link pivotally connecting one end of said lever with the forward end of the frame, a spring-cushioned rod having its lower end pivotally connected with the opposite end of the rocking lever, and its upper end passing through a tube attached to the shaft and provided with a transverse pin above said tube, and a frame having its rear end rigidly attached to the bearing frame of the disks and its forward end pivotally attached to the frame proper of the machine, substantially as set forth.

3. In a grain drill, the combination, with a toe having downwardly converging sides with ways or recesses therein, of cutting disks bearing against the sides of the toe and also converged downwardly, said disks provided with inwardly extending headed trunnions at right angles thereto, said trunnions journaled in the recesses or ways, substantially as set forth.

4. In a grain drill, the combination, of a toe having downwardly converging sides, provided with ways or recesses, cutting disks bearing against the sides of the toe and also converging downwardly, said disks provided with inwardly extending headed trunnions at right angles thereto, said trunnions journaled in the recesses or ways, and a removable plate covering the open ends of the ways, substantially as set forth.

5. In a grain drill, the combination, of a V-shaped toe having ways upon opposite sides thereof, the bordering edges of said ways being beveled, cutting disks arranged upon opposite sides of the toe and provided with inwardly extending headed trunnions having bearings in the ways, and blocks having beveled edges registering with the bevels of the ways and their lower ends semi-circularly recessed to fit the trunnions and also provided with shoulders bearing upon the headed portions of said trunnions, substantially as set forth.

6. In a grain drill, the combination, of a seed tube formed or provided at its lower end with a forwardly extending toe provided upon opposite sides with ways and having extending upwardly therefrom eyed lugs, cutting disks upon opposite sides of the toe provided with trunnions fitting the ways, a removable top plate having one end fitting beneath a lug formed upon the seed tube and its opposite end passing between the upwardly extending eyed lugs, a rocking lever journaled upon a transverse pin having bearings in the eyed lugs, a covering wheel frame, a link pivotally connecting said frame with one end of the rocking lever and a vertically movable spring-cushioned rod pivotally connected to the opposite end of the rocking lever, substantially as set forth.

7. In a grain drill, the combination, of cutters, scrapers consisting of pivoted arms provided with inwardly-extending pins or lugs, and a spring having its opposite ends engaging the lugs or pins and held in position thereby, said spring adapted to hold the operating ends of the arms yieldingly against the cutters, substantially as set forth.

In testimony whereof I affix my signature in presence of two witnesses.

ERNST H. GRAFUNDER.

Witnesses:
ARTHUR L. MORSELL,
ANNA V. FAUST.